(12) United States Patent
De Le fevre

(10) Patent No.: US 6,393,417 B1
(45) Date of Patent: May 21, 2002

(54) METHOD FOR PROVIDING A RAPID INTERNET SEARCH

(76) Inventor: Patrick Y. De Le fevre, 190 Mt. Auburn St. Apt, 2-2, Watertown, MA (US) 02472

(*) Notice: Subject to any disclaimer, the term of this patent is extended or adjusted under 35 U.S.C. 154(b) by 0 days.

(21) Appl. No.: 09/419,025

(22) Filed: Oct. 15, 1999

(51) Int. Cl.[7] .............................. G06F 7/00; G06F 17/30
(52) U.S. Cl. ...................... 707/6; 707/3; 707/4; 707/5; 707/7; 707/9; 709/217; 709/225; 709/226; 709/229
(58) Field of Search .............................. 709/217, 225, 709/226, 229; 707/3, 4, 5, 6, 7, 9

(56) References Cited

U.S. PATENT DOCUMENTS

| | | | | |
|---|---|---|---|---|
| 5,680,612 A | * | 10/1997 | Asada et al. ...................... 707/3 |
| 5,826,261 A | * | 10/1998 | Spencer .......................... 707/5 |
| 5,920,859 A | * | 7/1999 | Li ................................ 707/5 |
| 5,983,221 A | * | 11/1999 | Christy .......................... 707/5 |
| 6,038,668 A | * | 3/2000 | Chipman et al. ............ 713/201 |
| 6,052,714 A | * | 4/2000 | Mike et al. ................... 709/217 |
| 6,061,679 A | * | 5/2000 | Bournas et al. ................. 707/3 |
| 6,141,659 A | * | 6/2000 | Banker et al. ............... 707/102 |
| 6,108,645 A | * | 8/2000 | Eichstaedt et al. ............. 707/1 |
| 6,119,114 A | * | 9/2000 | Smadja .......................... 707/7 |
| 6,125,353 A | * | 9/2000 | Yagasaki ..................... 705/27 |
| 6,178,416 B1 | * | 1/2001 | Thompson et al. ............. 707/3 |
| 6,189,002 B1 | * | 2/2001 | Roitblat ........................ 707/1 |
| 6,199,067 B1 | * | 3/2001 | Geller .......................... 707/10 |
| 6,199,099 B1 | * | 3/2001 | Gershman et al. ........... 709/203 |
| 6,236,991 B1 | * | 5/2001 | Frauenhofer et al. .......... 707/6 |
| 6,256,623 B1 | * | 7/2001 | Jones ............................ 707/3 |

* cited by examiner

*Primary Examiner*—Saleh Najjar
(74) *Attorney, Agent, or Firm*—Robert K. Tendler

(57) ABSTRACT

A method is provided for rapid Internet searching through the creation of a "fingerprint" of information associated with a search request made by an individual. This fingerprint is forwarded to a library that locates information related to the fingerprint from information submitted by entrants who enter their data in accordance with a specialized master plan and format. In one embodiment the master plan has such universal parameters as description, location, price, consumer and consultant feedback, payment, shipment and time, insurance/warranty, and maintenance. A request is encoded in terms of a particular coordinate number reflecting master plan parameters as the fingerprint that is transmitted to the library. The fingerprint, in one embodiment includes the result of a series of branching operations to arrive at a decision or a coordinate number corresponding to a prescribed priority choices of parameters. The decision or coordinate number is then matched with those of the entrants and the results forwarded to the requestor of the information as an Internet website address. The result is an exceptionally rapid and accurate search to give the requester highly specific website information tailored to the fingerprint of the individual's requested items which can include his/her demographics and other pertinent data such as past search requests.

12 Claims, 11 Drawing Sheets

MASTER PLAN

PARAMETERS
- ① DESCRIPTION
- ② LOCATION
- ③ PRICE
- ④ CUSTOMER & CONSULTANT SERVICES
- ⑤ PAYMENT AGREEMENT
- ⑥ SHIPMENT & TIME
- ⑦ INSURANCE / WARRANTIES
- ⑧ MAINTENANCE
- ⑨ OTHERS

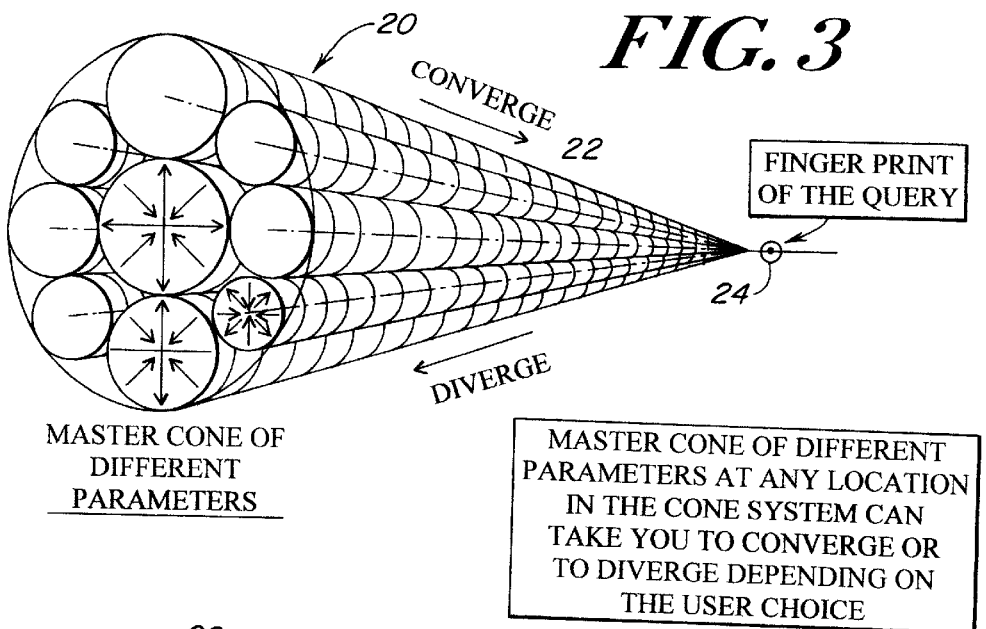

*FIG. 3*

MASTER CONE OF DIFFERENT PARAMETERS

FINGER PRINT OF THE QUERY

MASTER CONE OF DIFFERENT PARAMETERS AT ANY LOCATION IN THE CONE SYSTEM CAN TAKE YOU TO CONVERGE OR TO DIVERGE DEPENDING ON THE USER CHOICE

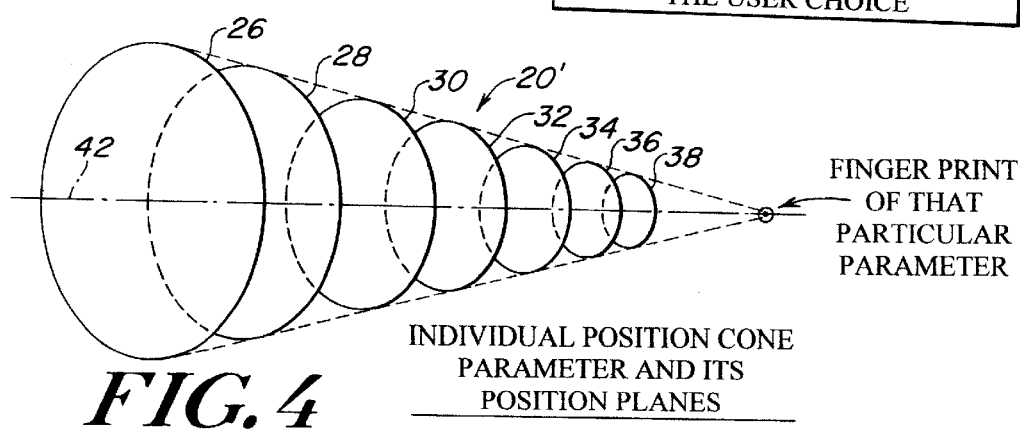

*FIG. 4*

FINGER PRINT OF THAT PARTICULAR PARAMETER

INDIVIDUAL POSITION CONE PARAMETER AND ITS POSITION PLANES

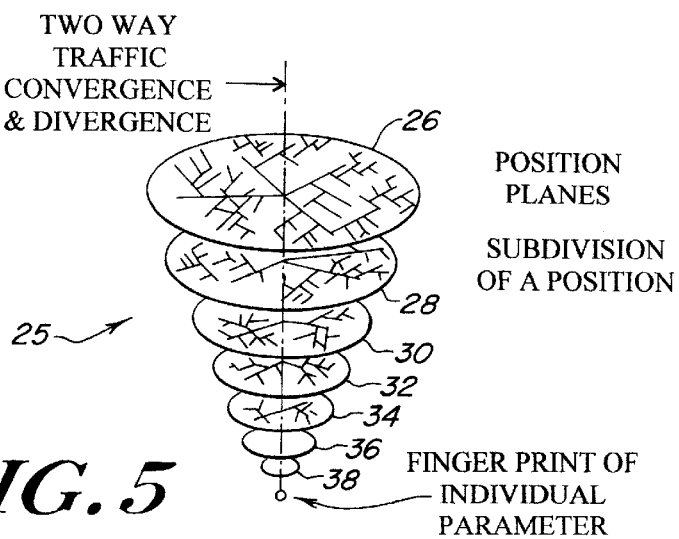

*FIG. 5*

TWO WAY TRAFFIC CONVERGENCE & DIVERGENCE

POSITION PLANES

SUBDIVISION OF A POSITION

FINGER PRINT OF INDIVIDUAL PARAMETER

METHOD FOR PROVIDING A RAPID INTERNET SEARCH

FIELD OF INVENTION

This invention relates to Internet search methods and more particularly to a fingerprint type searching method for rapid information retrieval.

BACKGROUND OF THE INVENTION

In the prior art, generalized search terms are utilized which are made to converge to specific items of interest. The problem with such generalized search engines is that normally a large amount of irrelevant data is also returned to the requesting party. The amount of time necessary to navigate through the information retrieved is significant. For instance, when one is searching a particular topic for a particular item to be purchased, presenting the search engine with generalized search terms such as key words, results in a flurry of activity to provide the individual requesting the search with pages and pages of information which must be scrolled through in order for the individual to pick that which is most likely to be of highest interest.

This is a time consuming chore and annoying at best because the individual requestor has to use a cumbersome highlighting and mouse-clicking operation which oftentimes results in not only irrelevant information but misleading search strategies.

SUMMARY OF THE INVENTION

Rather than utilizing a generalized search method using key words or the like, in the subject method, an individual "fingerprint" is created at the requestor site that describes the demographics of the requestor as well as description of a specific search request. In one embodiment this search request has associated with it a numbering system, with the result being a string of numbers that is transmitted to a search "library" containing the particular characteristics of the search, not only in terms of the specific item requested, but also in terms of preset parameters corresponding to a universal master plan. For instance, not only is the description, state, material, shape, color, of the particular item searched, generalized parameters including location, price, customer feedback, payment, shipment and time, insurance/warranty, and maintenance, are all parameters which can make up the fingerprint of the item requested.

When the description along with the rest of the parameters is transmitted by the requester to the library in terms of a particular number sequence or fingerprint, the information provided by entrants of the library is searched and the best match is found. Each entrant has a similar master plan of parameters such that both requestor and entrant are using the same master plan format. Specific matches result in the transmission to the recipient of the websites of those entrants that match the transmitted fingerprint.

What will be appreciated is that what is transmitted back to the requester is a highly tailored and specialized response of the system in terms of websites that contain information that the requester may want.

In one embodiment, a search request in terms of a fingerprint includes a series of branching operations in what can be conceived as a master cone, containing several subcones. Each subcone defines one of the parameters of the query. The branching operations within each subcone results in a set of numbers at the tip of each subcone, eventually resulting in a string of numbers or codes at the tip of the master cone. This set of numbers is the so-called decision number or coordinate number for the particular fingerprinted request. Thus the reference number reflects a particular information which is the result of a branch, with all of the reference numbers being put together in a string to form a particular coordinate number or decision number. Every inquiry is therefore transformed into a master cone that converges to the decision number. Note, the branching is under the user's control at his terminal.

The universal master plan employed permits rapid location of websites for the requesters and in one embodiment includes description, location, price, customer feedback, payment, shipment and time, insurance/warranty, and maintenance information. Each of the entrants in the library provides this type of information which is then stored, along with the website information of the entrant.

Upon query by the fingerprint from the requestor, a matching system in the library simply matches the decision or coordinate number to the prestored master plan parameters from the information entrants have submitted to the library in terms of their particular number or code.

In a further embodiment, divergence from the originally generated decision number is permitted, thus to expand the search should insufficient search results occur.

In summary, a method is provided for rapid Internet searching through the creation of a "fingerprint" of information associated with a search request made by an individual. This fingerprint is a code in one embodiment which is forwarded to a library that locates information related to the fingerprint from information submitted by entrants who enter their data in accordance with a specialized master plan and format. In one embodiment the master plan has such universal parameters as description, location, price, consumer and consultant feedback, payment, shipment and time, insurance/warranty, and maintenance. A request is encoded in terms of a particular coordinate number reflecting master plan parameters as the fingerprint that is transmitted to the library. The fingerprint, in one embodiment includes the result of a series of branching operations to arrive at a decision or a coordinate number corresponding to a prescribed priority choices of parameters. The decision or coordinate number is then matched with those of the entrants and the results forwarded to the requestor of the information as an Internet website address. The result is an exceptionally rapid and accurate search to give the requester highly specific website information tailored to the fingerprint of the individual's requested items which can include his/her demographics and other pertinent data such as past search requests.

BRIEF DESCRIPTION OF THE DRAWINGS

These and other features of the Subject Invention will be better understood in connection of the Detailed Description, in conjunction with the Drawings of which:

FIG. 3 is a diagrammatic representation of a master cone of different parameters in which all of the parameters converge to permit the generation of a string of numerals representing a fingerprint;

FIG. 4 is a diagrammatic representation of an individual subcone within the master cone of FIG. 3 showing a Position Cone and its position planes;

FIG. 5 is a diagrammatic representation of the cone of FIG. 4, illustrating subdivisions of a position within a position plane;

DETAILED DESCRIPTION

Figures 1, 2:
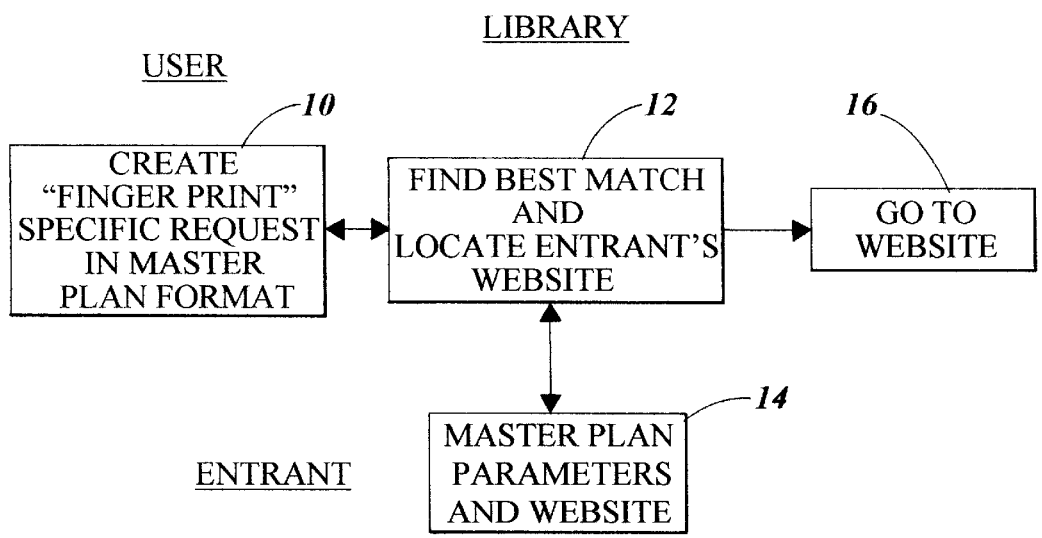
FIG. 1 is a block diagram of the subject internet search method showing the generation of the fingerprint which is transmitted to a library having information from a number of information entrants stored therein.
FIG. 2 is a table of master plan parameters.

Referring now to FIG. 1, the subject Internet search method includes the step of as illustrated at 10 of creating a fingerprint for the requestor. This fingerprint is a specific request for information and has within it specific information about the requesting party in terms of a master plan format. In one embodiment, a fingerprint is a series of numerals, numbers or codes which are transmitted to a library 12 which has prestored therein parameters from a large number of information entrants indicated at 14. These parameters are master plan parameters and include, as mentioned before, description, location, price, customer feedback, payment, shipment and time, insurance/warranty, and maintenance. It will be appreciated that other parameters may be useful for the master plan. It is important the entrants provide in addition to their parameters, their website address so that upon a query, library 12 is searched and matches are provided between the fingerprint from a requestor and the information from the entrants.

Thereafter, upon obtaining one or more matches, the method includes a step of locating the entrant and its websites by virtue of the coordinates associated with the fingerprint. The result is the entrant's website transmitted back to the requester.

It is important in the subject system that the information entrants and the requesters have a common set of parameters in this case referred to as the master plan. This is illustrated in FIG. 2, in which eight parameters are specified. In one embodiment, the parameters are as indicated above, namely the description, location, price, customer feedback, payment, shipment and time, insurance/warranty, and maintenance. Other parameters may be useful as well. The only requirement for the parameters is that they be used in the creation of the fingerprint and used in the information entered from the entrants into the library.

Referring now to FIG. 3, a master cone 20 which is a combination of all of the different parameters is illustrated, with each of the subcones relating to information concerning a given parameter. The master cone thus includes all of the master plan parameters, with convergence illustrated by arrow 22 towards a fingerprint 24 resulting from various choices that are made at each level of the convergence.

Referring to FIG. 4, given a particular subcone 20', there are a number of cross-sectional planes 26, 28, 30, 32, 34, 36, and 38, with decisions at each of the these planes further defining the information which is selected to be included in the fingerprint. It will be appreciated that, that which is contained at a given cross-sectional plane is information related to that particular parameter.

Assuming for instance, that subcone 20 represents the location parameter, plane 26 relates to an address information, then branches within that plane towards a central axis 42 to define for instance acceptable locations of the unit. For instance, if the requestor is seeking shoes, he may decide that the only source of the shoe is to be the northeastern states. This particular parameter is specified at plane 26 by virtue of providing a numbering system that will be described hereinafter.

In addition to specifying that the shoe is required to be available in the northeastern states, the individual may want to specify an address for the main office, addresses for technical support, an address for payment for the shoes, where the shoes are to be returned, and all types of address-based information. In addition, as a branching operation for each of these items, for instance the main office, one may wish to specify the continent, country, state, city, street, building, floor, apartment, zip code, post office box, telephone number, email address, or other information.

This information is added to the fingerprint by specifying it at this first plane. It will be appreciated that if the requestor does not wish to provide this information, it need not be provided. The important point is that the master plan permits this level of information to be added to the fingerprint at the time of requesting of the information.

By way of example, plane 28 may specify a limit on the amount of distance that the shoe is to travel between the shipping point and the recipient point. Furthermore, this plane may specify by what mode the shipment is to be made, e.g. either by air, truck, train, or by ship.

One further position plane such as plane 30 may specify the routing of the unit from the shipping site to the requester site. Moreover, it may be important to the requester that the shoe be available for viewing at a particular location. Additionally, this plane may be one requiring the output of instructions to the requester as to how to get to a viewing site, for instance at a shopping mall.

A further plane such as illustrated at 32 may be utilized to specify the types of transportation available for the requestor to go to the viewing site. At this plane, the requester can specify whether this transportation is to be either paid or courtesy.

At plane 34, a further type of requester specified information may be for instance, are samples available and if so, are they free or for a charge. The requestor may also specify whether he requires a professional sample or a production sample. Moreover, the requester can specify whether the sample may be kept for an indefinite period of time or what the return policy is on the sample.

Position plane 36 may for instance be used for indicating whether any special permits are required to view the item or to purchase the item. Moreover, any other prerequisites for the viewing and purchasing of the item may be specified at this plane. Finally, plane 38 may be utilized for any other information that is location sensitive.

Referring now to FIG. 5, various convergence planes are illustrated. In FIG. 5, the cone is the Description Cone, here illustrated at 25. The branching operations for the various planes within this cone are schematically illustrated at planes 26–38, with the branching operation to be described hereinafter.

What will be appreciated is that for each of the parameters of the master plan, branches as to the information required are performed at each of the position planes, with each of the position planes, in one embodiment, producing a number or code which is then passed down through the subsequent position planes, with the number specifying by its value and position in the string the result of the branching at each plane.

What will be appreciated is that there are almost limitless possibilities for each of the planes depending on how the plane is viewed. However, by making selections within a given plane, these limitless possibilities are honed down and converged in the sense of providing an indication of the choices made by each branching operation at a plane. In one embodiment, the choices for each plane are encoded as a particular number in a particular position. When these numbers are added together, the result is a string of numbers or codes for instance at the tip of the parameter subcone 24 which is the fingerprint of that particular parameter and reflects the ultimate desire of the requestor to provide as specific information as possible.

It will be appreciated that when all the numbers or numerals for all the parameters are added together, it will create a string corresponding to the final fingerprint for the query. This fingerprint when transmitted to the library, constitutes an exceedingly specific request for information. Since the entrants to the library also have this master plan format, this permits a matching process to occur at the library to match this rather specific request. The requested information is then transmitted back to the requestor in the form of a website of the entrant, with the website being preselected by virtue of the fingerprint.

In one embodiment, the website contains information preformatted to the master plan so that the requester can obtain as rapidly as possible the requested information in a form which matches his/her request.

For instance, a requester in Ecuador may have certain requirements not only for the item requested but the manner of shipment, price, and other parameters. His/her fingerprint when transmitted to the library requires a matching with only those vendors who can satisfy the individual request.

For instance the fingerprint sets certain priorities for the requestor, in this case for instance, that the vendor must not be more than 1000 km from Ecuador, and the price may not exceed a certain price. Moreover, the payment must be in Ecuadorian currency. In this manner, the requestor need not sift through large amounts of information in order to see the best source for the requested item.

Assuming that there is no vendor that can match all of the parameters indicated in the fingerprint, a system is provided to diverge as illustrated by arrow 42 in FIG. 3, so that the next best vendor based on the prioritized order of parameters will be transmitted to the requestor. For instance, if there is a vendor match in everything except the price, then that information which will be returned to the requestor is a vendor which matches in an all except the price aspect. Thus, the system not only converges to a point of specificity for the requester, but also accommodates a situation in which there may be no such match for the specific request. In this case a prioritized divergence is specified so that information returned to the requester may be made on some prioritized basis. For instance in the foregoing example, if there is no company that provides free samples, the requestor is apprised of this situation and is given vendors who match all of the other parameters.

Figure 6:
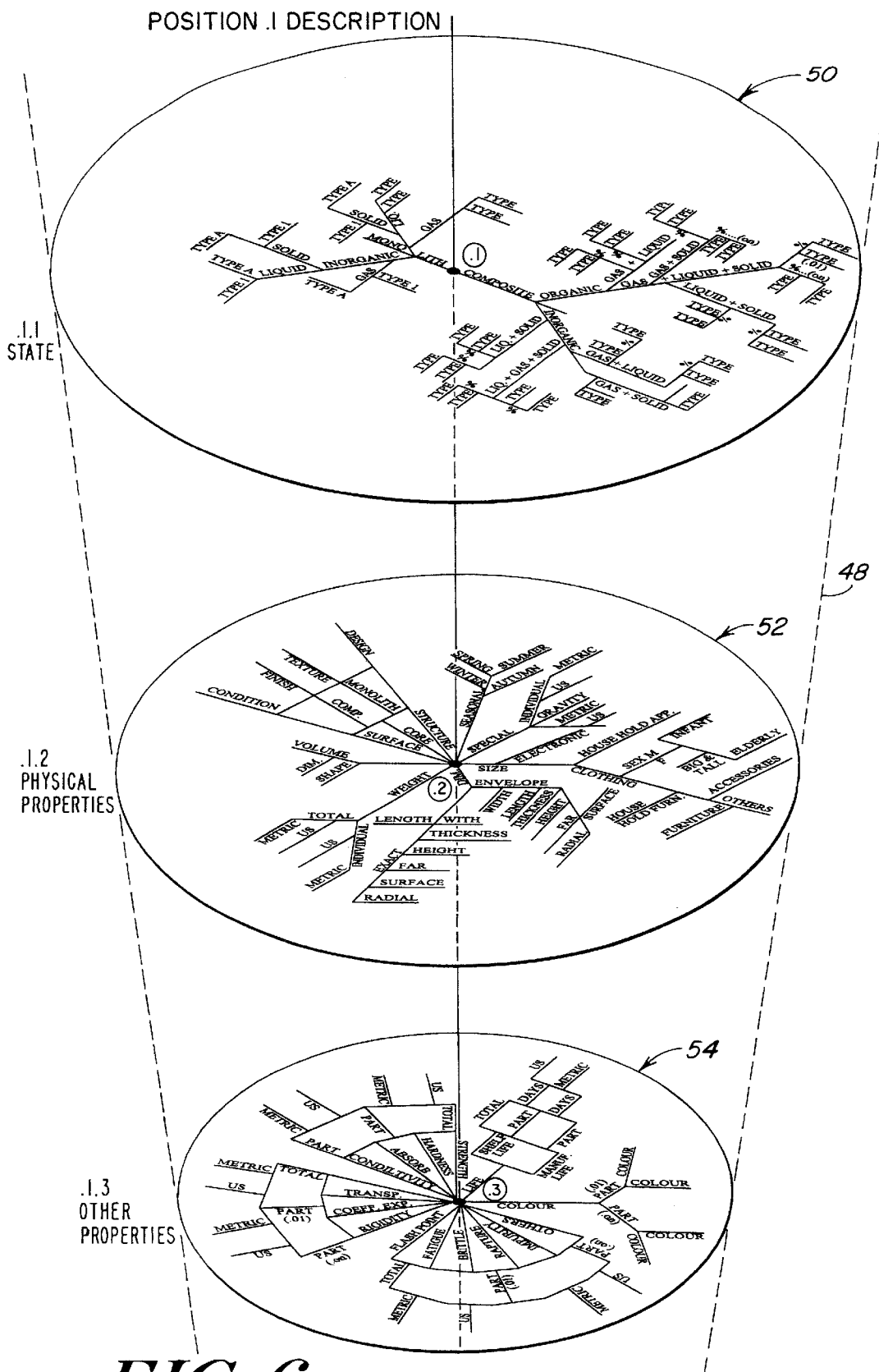
FIG. 6 is a diagrammatic representation of a Description Cone.

Referring now to FIG. 6, subcone 48 describes the Description parameter. As can be seen from plane 50, there are a number of different identifying features of the item. Description is given a reference numeral .1, with the Description being further modified by for instance "status." Status in the subject example for instance means whether or not the particular part is monolithic or a composite, whether it is organic, gas, liquid or solid.

Plane 52 further defines the Description as to what its properties are, in this case physical properties. These properties can be for instance the shape, the dimensions, the envelope, the weight, or specific gravity.

Plane 54 describes other properties such as transparency, surface, paint, color, hardness, or absorbency.

As can be seen the numerical designator to the choice made is appended to the description numeral which in this case is .1. 3.

Figure 7:
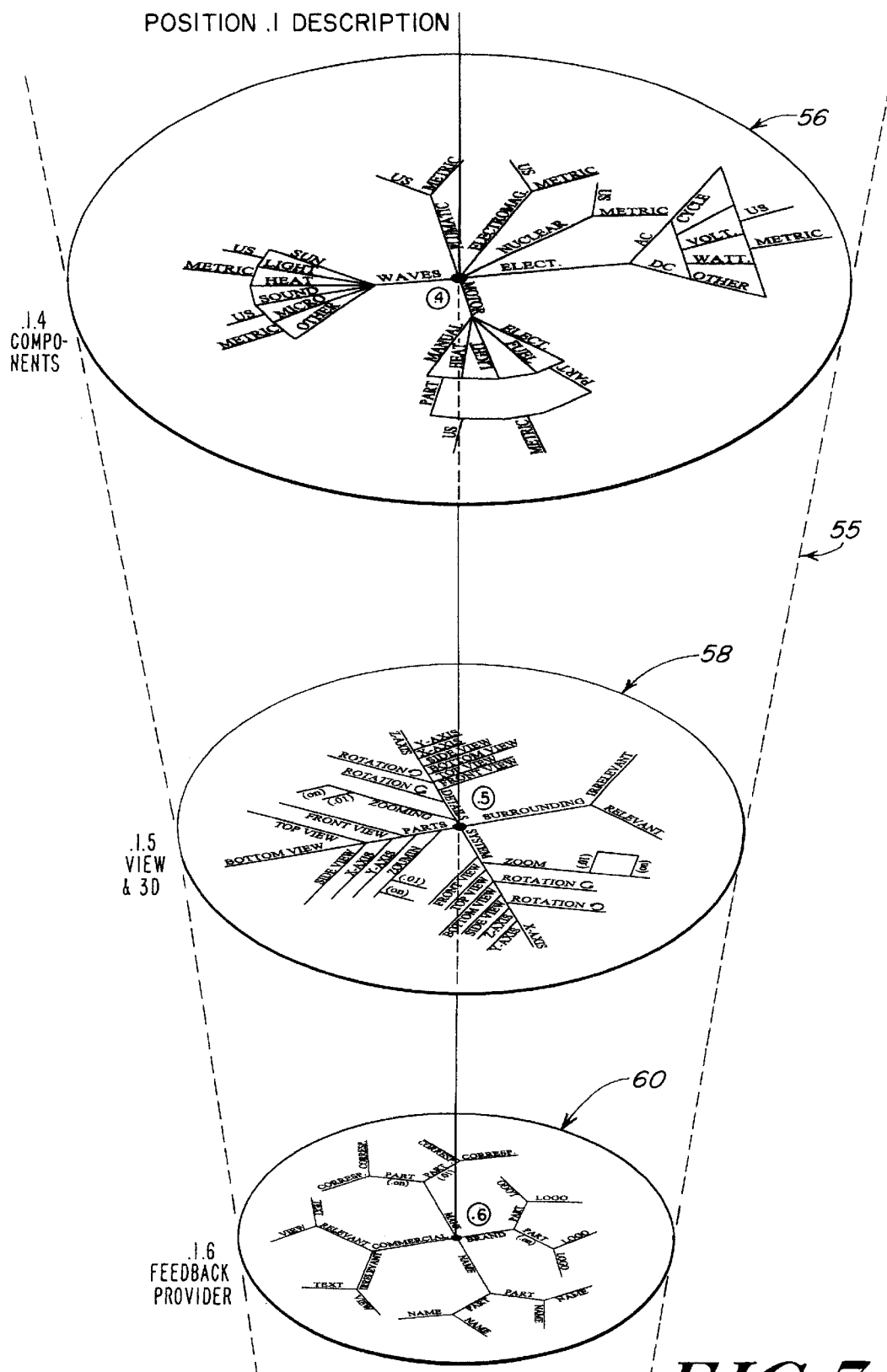
FIG. 7 is a diagrammatic representation of a further portion of the Description Cone of FIG. 6.

Referring now to FIG. 7, subcone 55 describes the Type of item requested, that is what kind of components the item is made of. The component may be electrical, electromagnetic, pneumatic, wave energy. This is shown by plane 56.

As illustrated by plane 58, viewing is described in terms of whether item is to be viewed in top-view, side-view, isometric-view, or the like.

Plane 60 refers to information fed back by the vendor to the requestor to further identify the item. This may include, brand, manufacturer, name of the product, or the like.

Figure 8:
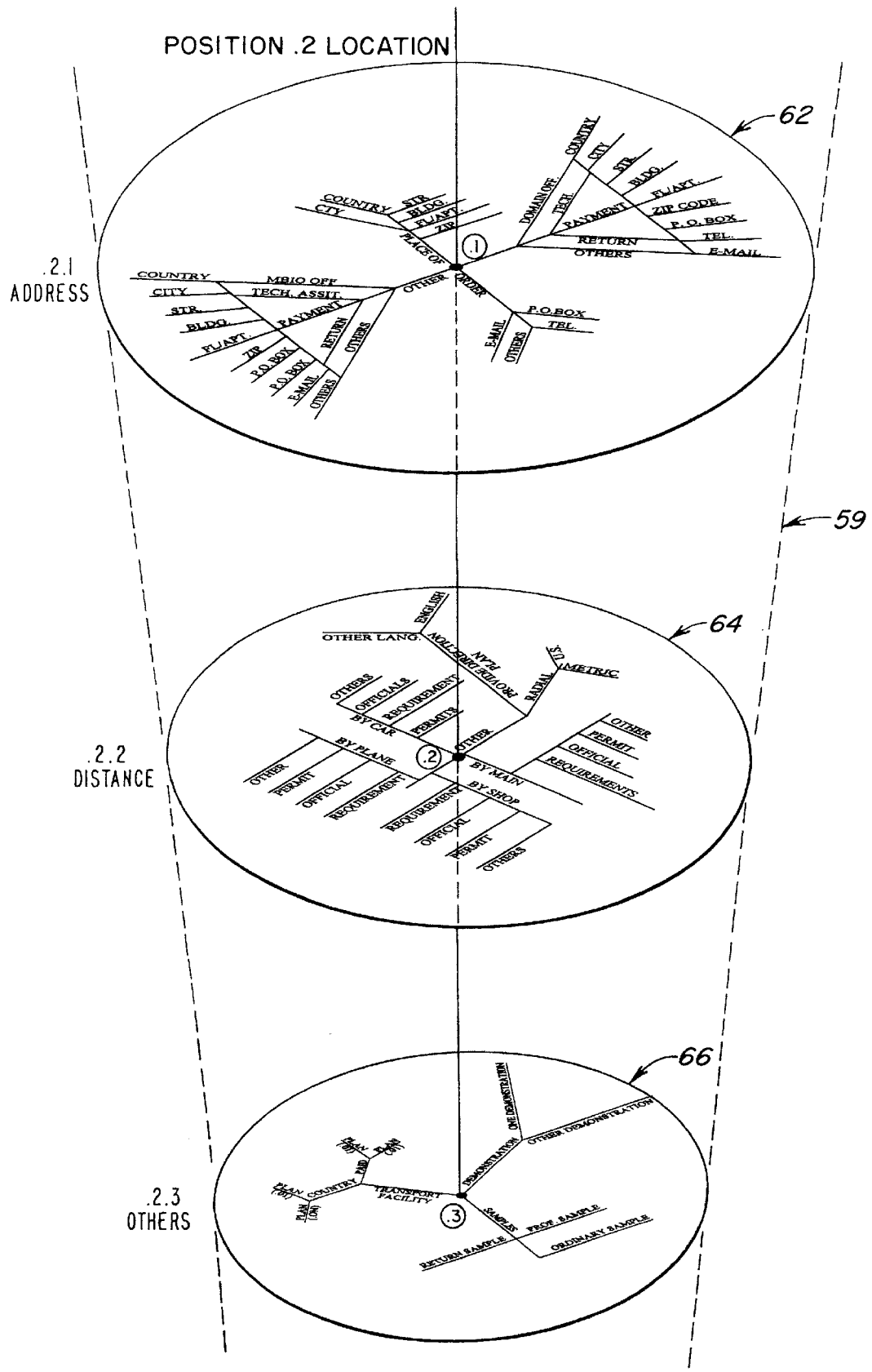
FIG. 8 is a diagrammatic representation of a Location Cone.

Referring now to FIG. 8, subcone 59 refers to the Location parameter and plane 62 describes addresses for all the information described hereinabove.

Plane 64 describes the distance from the requester to the vendor, whereas plane 66 describes other information which may be relevant to the requester.

Figure 9:
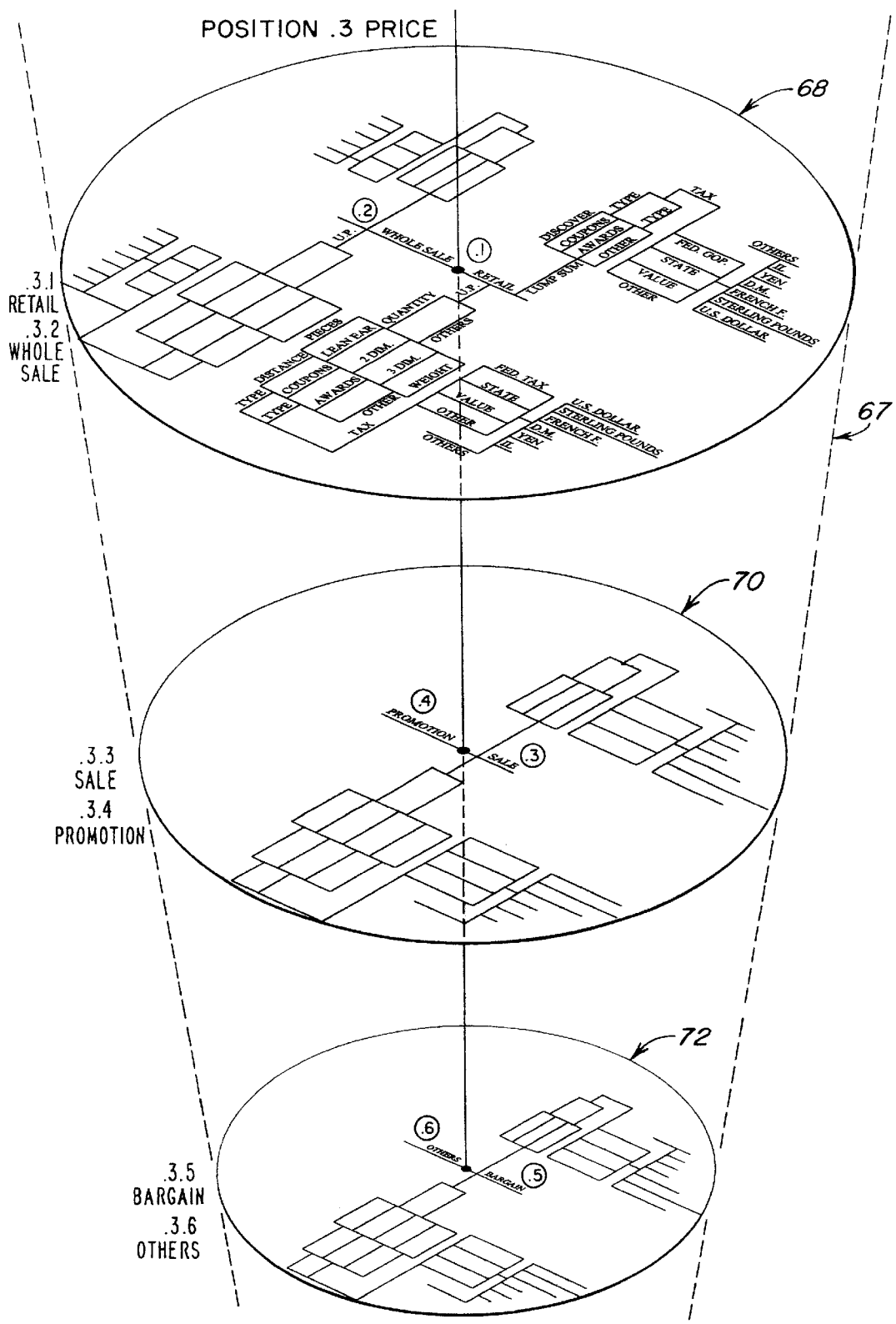
FIG. 9 is a diagrammatic representation of a Price Cone.

Referring now to FIG. 9, subcone 67 refers to Price. Plane 68 describes price which is whether or not it is a retail or wholesale price and what the monetary denomination is.

Plane 70 relates to information concerning whether or not the particular price reflects a sale price or promotion price.

Plane 72 describes whether it is a bargain basement price or other type of price.

Figure 10:
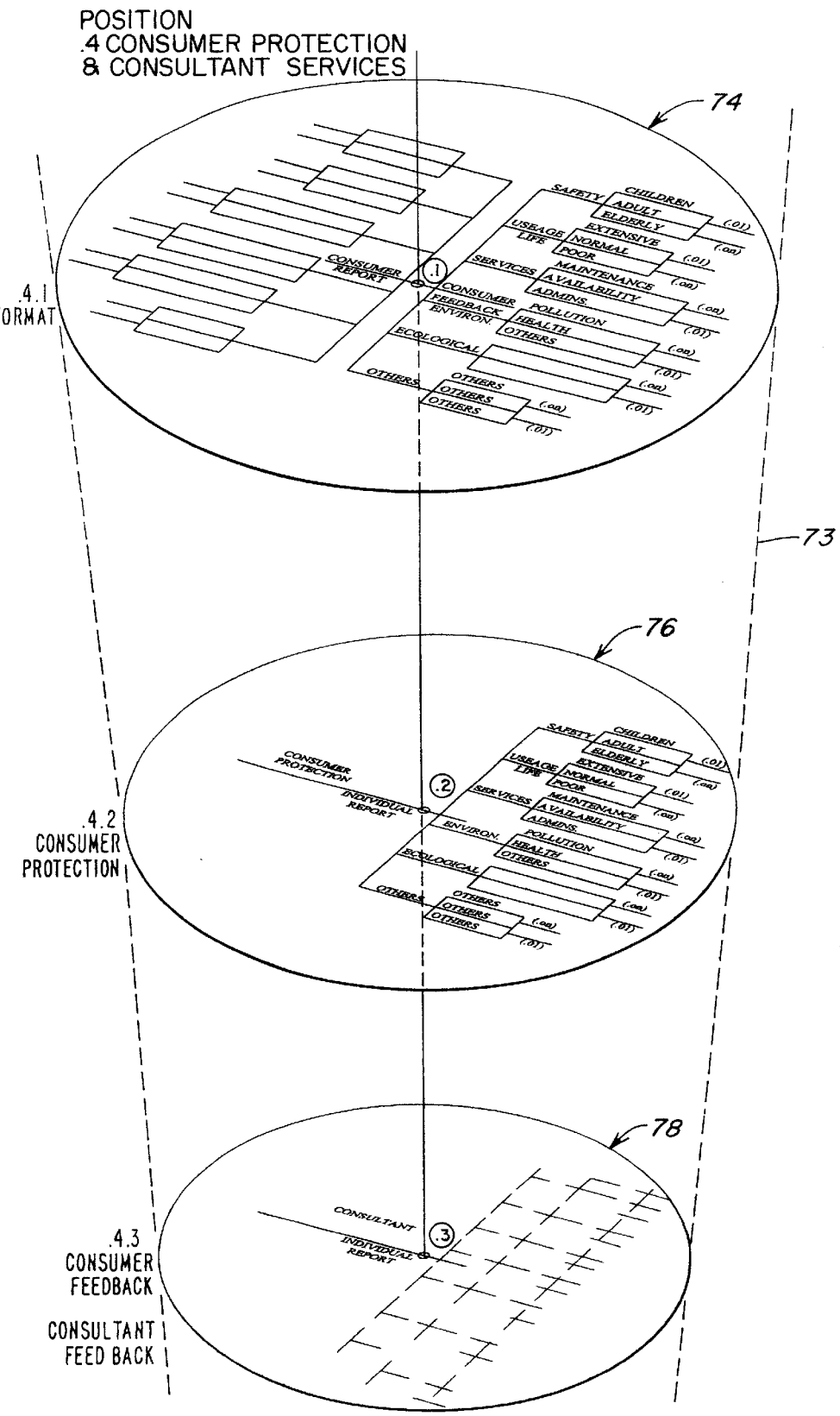
FIG. 10 is a diagrammatic representation of a Consumer Protection and Consultant Services Cone.

Referring now to FIG. 10, subcone 73 refers to Consumer Relevant Issues. Plane 74 describes the consumer protection format, for instance consumer safety and other information relative thereto.

Plane 76 describes on-line consumer protection services and product review information desired by the requestor and/or offered by the vendor.

Plane 78 describes consultant feedback to the requester, for instance for consulting services such as in the case of clothes and shoes provided by a fashion consulting service.

Figure 11:
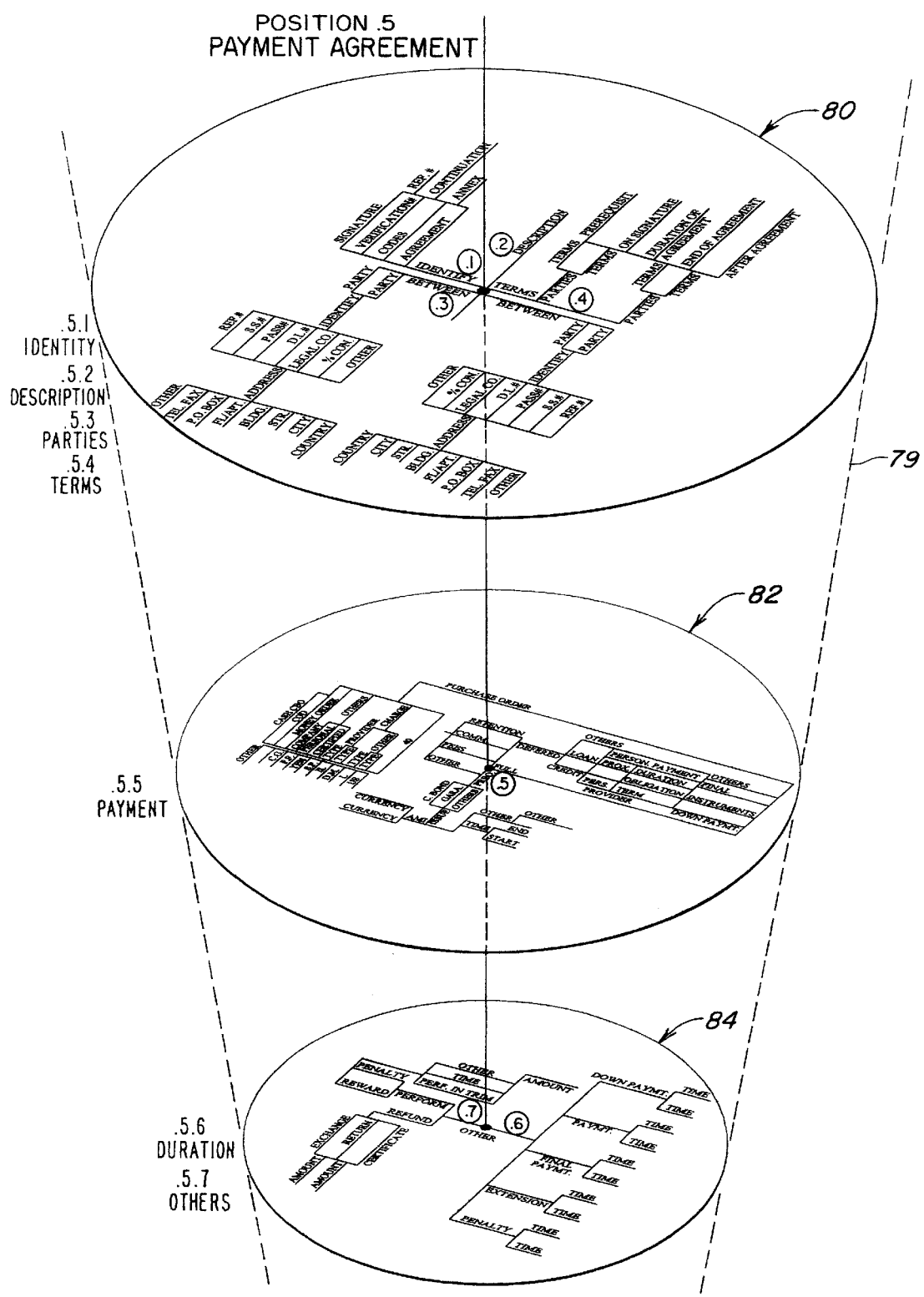
FIG. 11 is a diagrammatic representation of a Payment Agreement Cone.

Referring now to FIG. 11, subcone 79 refers to Payment. Plane 80 refers to payment agreement type terms, whereas plane 82 describes the manner in which a payment can be effectuated, such as full payment, or deferred payment. Plane 84, describes duration of the payment agreement.

Figure 12:
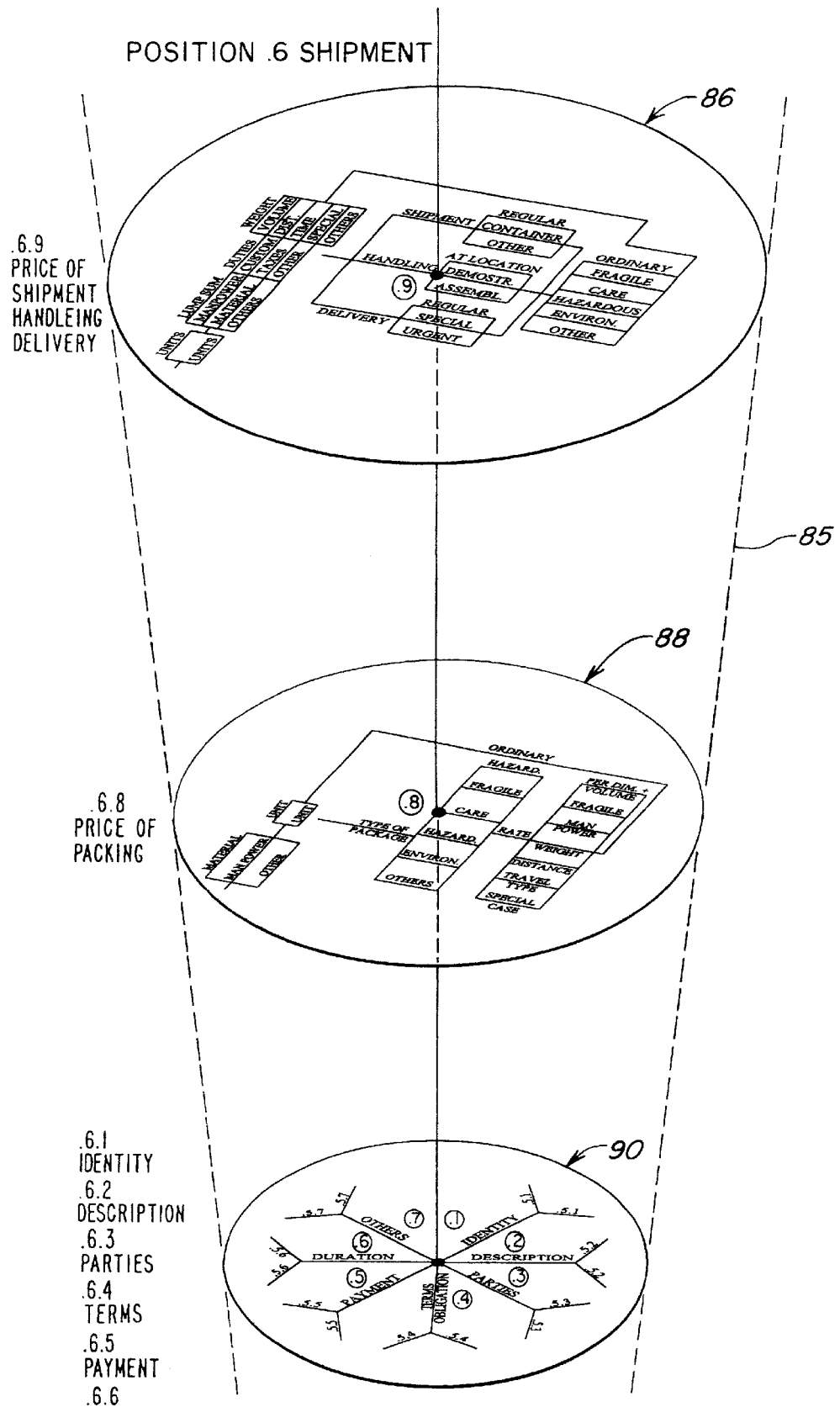
FIG. 12 is a diagrammatic representation of a Shipment Cone.

Referring now to FIG. 12, subcone 85 refers to Shipping. Plane 86 refers to shipment information such as handling and delivery, whereas plane 88 describes packing requirements of the requester. Plane 90 describes the terms of payment for the shipment itself.

Figure 13:
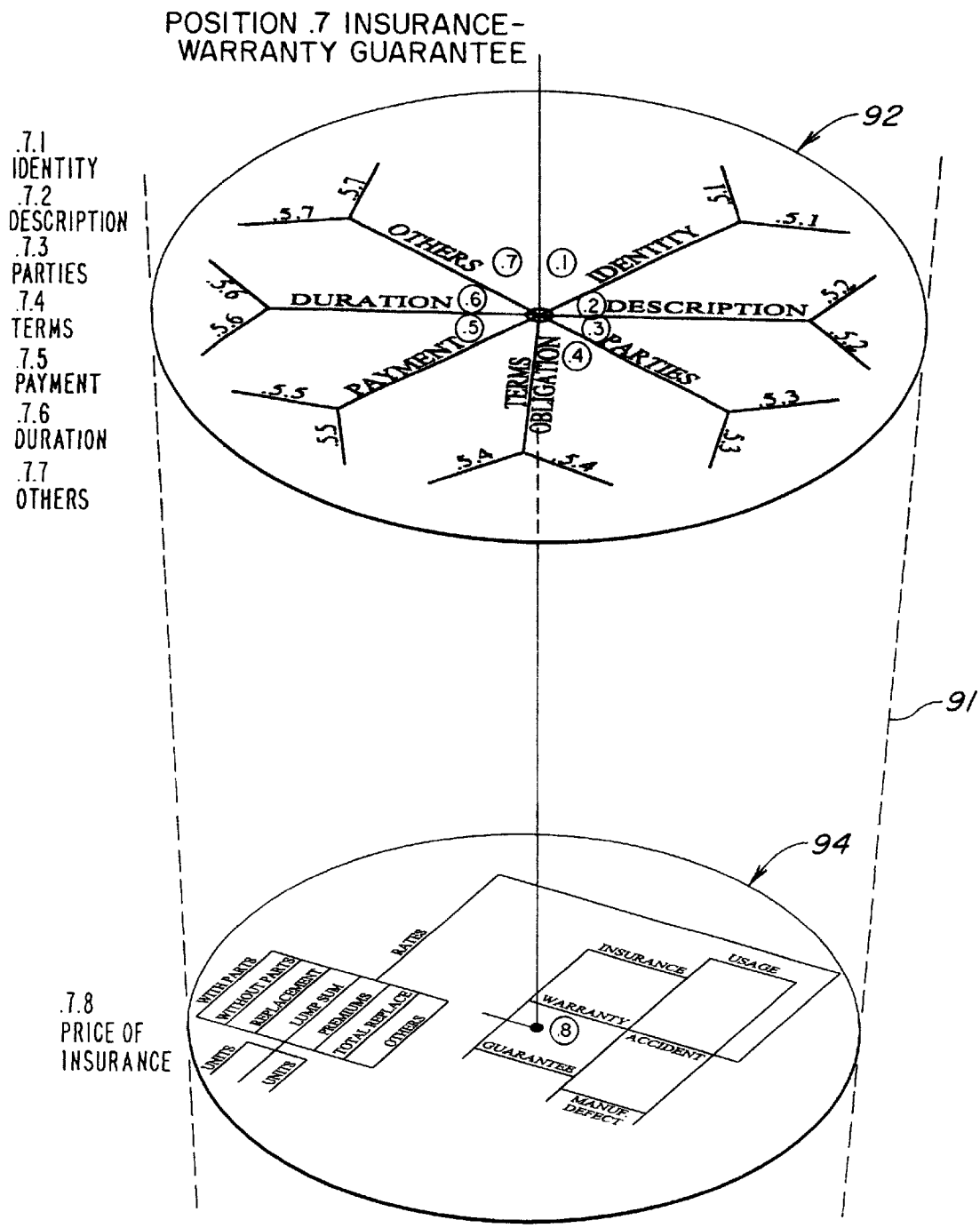
FIG. 13 is a diagrammatic representation of an Insurance, Warranty and Guarantee Cone; and, FIG. 14 is a diagrammatic representation of a Maintenance Cone.

Referring now to FIG. 13, subcone 91 relates to Insurance and Warranty. Plane 92 describes insurance and warranty information, whereas plane 94 describes the specific warranty provisions.

Figure 14:
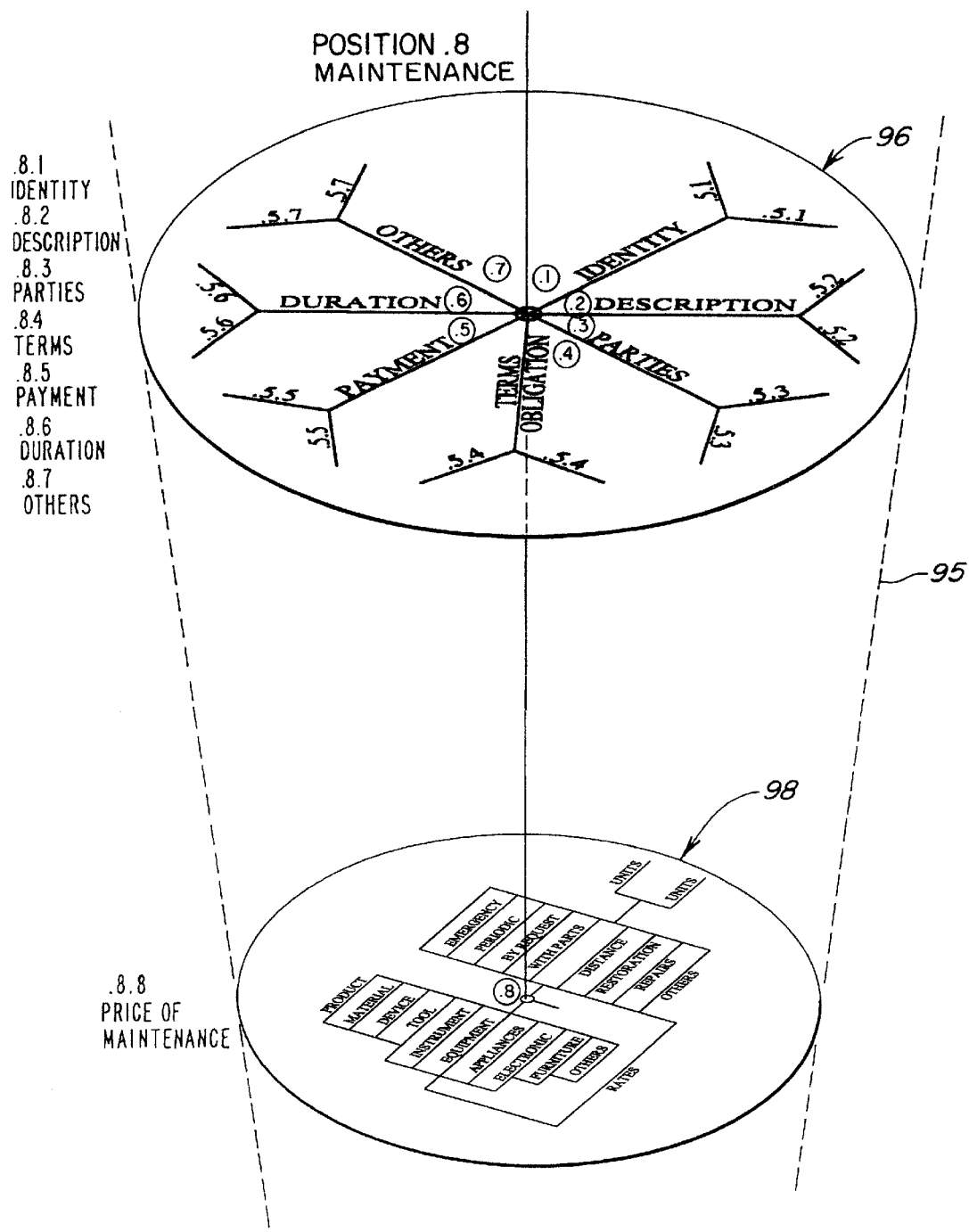

Referring now to FIG. 14, subcone 95 relates to maintenance. Plane 96 relates to payments for maintenance, whereas plane 98 applies to rates for maintenance.

What will be appreciated is that at each level or plane, a series of numbers or codes is generated which contribute in the end to the fingerprint, with each of the numbers or numerals by virtue of their value and position being associated with a given piece of information in the master plan. The individual making the request can leave any of the items blank that he/she desires. However, by filling out more of the information in each of the planes, the individual can make the request exceedingly specific.

The result is that the information returned to the individual from the subject method is exceedingly specific to the fingerprint generated in this matter such that exact matches provide instant information to the individual without the individual being required to sift through numerous responses. The result for the individual is a targeted search for items, whereas the result for the entrants in the library is the identification of a likely customer for their particular product, with the customer having been pre-qualified in the sense that the transmission of the website to the requestor is one that exactly matches the requestor's desires. If the requestor is sophisticated, the response to his or her request will be highly targeted to his or her fingerprint. For the less sophisticated, the subject method is nonetheless advantageous, with the advantage relating to the degree of sophistication of the requester.

The following list in tabular form is a numeric system for each of the subcones to define master plan parameters therein:

Parameter 1: Description
1.1
  STATE
1.2
  PHYSICAL PROPERTIES
1.3
  OTHER PROPERTIES
1.4
  COMPONENTS
1.5
  VIEW & 3D
1.6
  FEED BACK BY PROVIDER
Parameter 2: Location
2.1
  ADDRESS
2.2
  DISTANCE
2.3
  OTHERS
Parameter 3: Price
3.1
  RETAIL
3.2
  WHOLESALE
3.3
  SALE
3.4
  PROMOTION
3.5
  BARGAIN
3.6
  OTHERS
Parameter 4: Consumer Protection & Consultant Services
4.1
  FORMAT
4.2
  CONSUMER PROTECTION
4.3
  CONSUMER FEEDBACK
Parameter 5: Payment Agreement
5.1
  IDENTITY
5.2
  DESCRIPTION & SPECS
5.3
  PARTIES
5.4
  TERMS AND OBLIGATIONS
5.5
  PAYMENT
5.6
  DURATION
5.7
  OTHERS
Parameter 6: Shipment
6.1
  IDENTITY
6.2
  DESCRIPTION & SPECS
6.3
  PARTIES
6.4
  TERMS AND CONDITIONS
6.5
  PAYMENT
6.6
  DURATION
6.7
  OTHERS
6.8
  PRICE OF PACKING
6.9
  PRICE OF HANDLING
  PRICE OF DELIVERY
  PRICE OF SHIPMENT
Parameter 7: Insurance-Warranty-Guarantee
7.1
  IDENTITY
7.2
  DESCRIPTION & SPECS
7.3
  PARTIES
7.4
  TERMS AND OBLIGATIONS
7.5
  PAYMENT
7.6
  DURATION
7.7
  OTHERS
7.8
  PRICE OF INSURANCE
Parameter 8: Maintenance
8.1
  IDENTITY
8.2
  DESCRIPTION & SPECS 8.3
  PARTIES 8.4
  TERMS & OBLIGATION 8.5
  PAYMENT 8.6
  DURATION 8.7
  OTHERS 8.8
  PRICE OF MAINTENANCE The following illustrative example will further describe the methodology:

For instance, a consumer or user is interested in buying an Olympus Digital Camera, with the following choices of parameters and their priorities

TABLE I

| CODE | PARAMETERS | PRIORITY LEVEL | CREATE INPUT | FINGERPRINT OF THE PARAMETER |
|---|---|---|---|---|
| .1 | DESCRIPTION | 1 | BRAND NAME MODEL NAME | (.1 . . . 06.08) |
| .3 | PRICE | 2 | $ (100–150) | (.3 . . . 09) |
| .7 | INSURANCE/ WARRANTY | 3 | 2 YEARS W/PARTS | (.7 . . . 07.02) |
| .8 | MAINTENANCE | 4 | REQUIRED | (.8 . . . 05) |
| .2 | LOCATION | 5 | 20 MILE DISTANCE | (.2 . . . 04) |
| .5 | PAYMENT | 6 | PURCHASE ORDER | (.5 . . . 03) |
| .4 | CONSUMER PRIORITY | N/A | | |
| .6 | SHIPMENT | N/A | | |
| .9 | OTHERS | N/A | | |

The information entered by the user is converted into a string of numerals that forms the "fingerprint" of each individual parameter, hence the addition of all those numerals will identify the fingerprint of the requested item,

[(.1.01 . . . 06.08).00.(.3.01 . . . 09).00.(.7.01 . . . 07.02).00 (.8.01 . . . 04).00.(.5.01 . . . 03)]=fingerprint of query.

On the other hand, the information that is provided by the entrants to the library, which has the same format and master plan as the users, is also converted into a series of numerical codes and are stored in the library. Upon receipt of the query, in the library, a system compares this fingerprint with the stored information within the library and locates either an exact match, if one exists, or the next best alternative, according to the specified parameters and the order of priority. This matched information, then is transferred back to the user in terms of web site information of the entrant or entrants.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

I claim:

1. A method for providing a rapid internet search for participating vendors, each having an internet website comprising the steps of:

a user creating an inquiry defined by a fingerprint of information containing information categorized as parameters product detail information in accordance with a master plan, the parameters of the master plan being annotated in a number of converging cones of information, each corresponding to a different parameter, each cone having a number of planes at which details of a parameter are encoded with the parameter being the sum of the details, and such that all parameters associated with all cones are used in the query fingerprint;

for each participating vendor, storing information associated with a vendor in accordance with the master plan and coded in a way so as to permit matching of parameters of a participating vendor with those of a fingerprint; and, upon a match, transmitting the website of the matching vendor to the user, wherein a user can make a targeted request, returned to the user with the website of the participating vender having the closest match to the user's fingerprint.

2. The method of claim 1, wherein the coding includes a numeral string, with positions of numerals in the string defining predetermined parameter elements.

3. The method of claim 2, wherein numerals from each of the planes in a cone are accumulated into a string.

4. The method of claim 3, wherein the numeral strings from each of the cones are accumulated to create the fingerprint.

5. The method of claim 1, and further including the step of branching of parameter elements at each plane to select a pre-determined element from the set of elements at each plane, thus to cause cones to converge using selected parameter elements, thus to narrow a user search request.

6. The method of claim 5, and further including the step of diverging from the fingerprint assuming no direct match with vendor supplied parameters.

7. The method of claim 6, wherein the diverging step includes deselecting the result of a previous branch.

8. The method of claim 1, wherein the fingerprint and master plan are coded with the use of numeral strings.

9. The method of claim 1, wherein the finger print and master plan are coded via characters.

10. The method of claim 9, wherein the characters include bar codes.

11. Method of claim 9, wherein the characters include magnetic strip elements.

12. The method of claim 1, wherein the finger print and master plan are coded with numbers arranged in a predetermined order.

* * * * *